May 22, 1928.

J. B. ARMITAGE

POWER TRANSMITTING MECHANISM

Filed June 4, 1923

INVENTOR.

Joseph B. Armitage

BY

Erwin, Wheeler and Woolard

ATTORNEYS.

May 22, 1928. 1,670,794
J. B. ARMITAGE
POWER TRANSMITTING MECHANISM
Filed June 4, 1923 3 Sheets-Sheet 3

INVENTOR.
Joseph B. Armitage
BY
Erwin, Wheeler & Woolard
ATTORNEYS.

Patented May 22, 1928.

1,670,794

UNITED STATES PATENT OFFICE.

JOSEPH B. ARMITAGE, OF MILWAUKEE, WISCONSIN, ASSIGNOR TO KEARNEY & TRECKER CORPORATION, OF WEST ALLIS, WISCONSIN.

POWER-TRANSMITTING MECHANISM.

Application filed June 4, 1923. Serial No. 643,290.

This invention relates to improvements in power transmitting mechanisms and more particularly to a drive adapted to be used on a machine tool for the actuation of a table and attachment thereon.

It is customary in machine tool practice to provide a table which is adjustable along one or more lines of travel. Upon such a table the work is supported, either directly or by the use of attachments, many of which include work supporting elements which are themselves rotatably or otherwise adjustable. Where it is desired to actuate such attachments (or their work supporting elements) by power, it is convenient to derive the necessary propulsion from the same source through which the table is driven.

The table is usually driven through a nut and screw. Either the nut or the screw may translate with the table and either may be rotated to effect such translation. The preferred construction, however, is one in which the nut is fixed and the screw is rotatably mounted in the table to translate therewith. In the following discussion the preferred construction only will be described and this may be taken as exemplifying the several alternatives mentioned.

In order to provide conveniently for the actuation of the table and the attachment from a common source of power, various expedients have hitherto been followed. For example, the driving train to the screw has been made to include a power shaft which has been extended to the end of the table and utilized to drive the attachment. Such an arrangement is, however, open to the objection that the power shaft is always in operation when the screw is in use. It is frequently desirable to operate the table while permitting the attachment to remain at rest. The present invention contemplates the provision of a driving train with a centralized control enabling the operator to render either the screw or shaft operative at will.

Broadly stated, it is the object of this invention to provide a novel driving train including suitable manually and mechanically actuated clutches under the immediate control of an operator and arranged to enable him to complete driving connections to either of two driven elements from a single driving source, whereby either of said elements may be driven independently of the other. It is the particular object of this invention to apply such a driving train to a machine tool to enable the table and an attachment to be more completely under the operator's control than has hitherto been possible, the table drive and attachment drive being alternatively operable in either direction from a common source of power.

It is a further important object of this invention to provide an interlocking control mechanism adapted to prevent the simultaneous actuation of both the screw and power shaft through the power transmitting mechanism herein disclosed. It is contemplated that great advantages may be derived through the use, with this invention, of a special set of change speed gearing through which the screw and power shaft may be interconnected at the end of the table. It is very desirable, therefore, that the present device include an interlock preventing the simultaneous actuation of screw and shaft except through the extraneous mechanism above referred to, which forms the particular subject matter of a companion application.

Further objects are to provide a device incorporating the important provision of means for driving the table screw at a speed different, and preferably lower, than the speed at which the power shaft may be driven from the same source; to provide comparatively fast running clutches for establishing all driving connections; and to provide novel driving mechanism for the purposes aforesaid which can be concentrated compactly into small compass for convenience of mounting in the limited space available.

In the accompanying drawings.

Like parts are identified by the same reference characters throughout the several views.

Figures 1, 2:
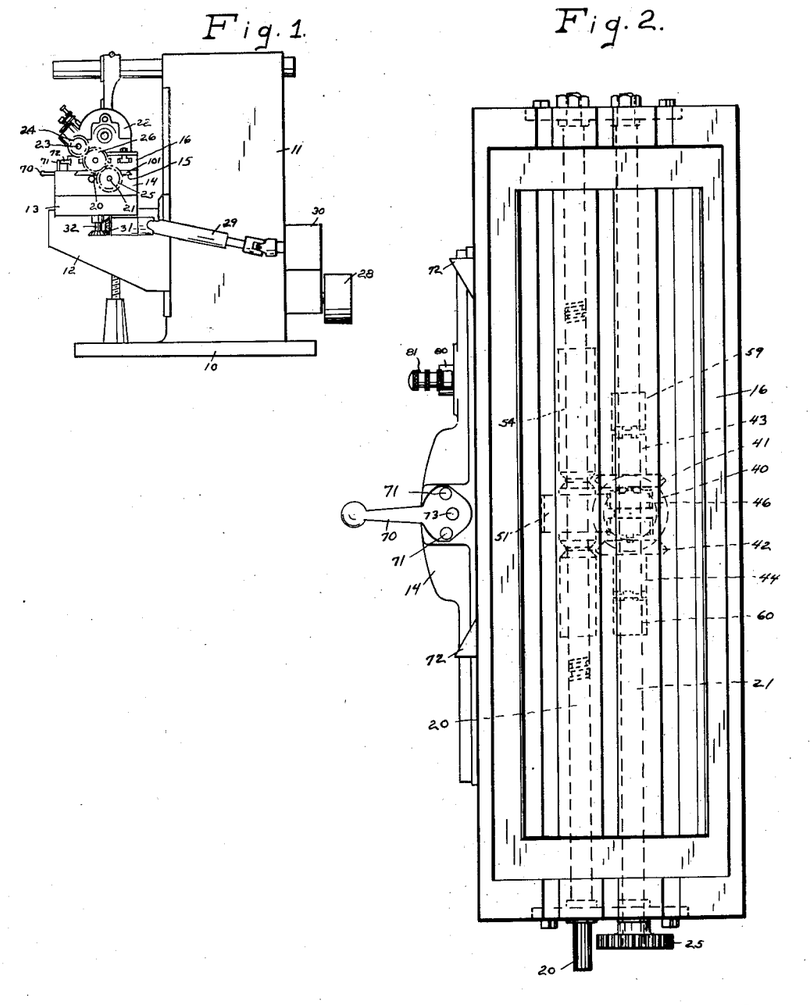
Figure 1 is a side elevation of a machine tool comprising a knee and column type milling machine provided with a table carrying a dividing head attachment arranged to be driven through mechanism embodying this invention.
Figure 2 is a plan view of a complete machine tool table illustrating in dotted lines the relative positions of driving elements embodying this invention.

Although this invention may be applied by those skilled in the art to a wide variety of purposes, it is illustrated in the accompanying drawings, and particularly in Figure 1, as being applied to a knee and column milling machine of otherwise standard construction. This machine comprises a base 10 supporting a column 11 with respect to which a knee 12 is vertically adjusted. A saddle 13 is slidable to and from the column upon the knee and supports a swivel block 14 rotatable with respect to the saddle. The particular machine illustrated is, therefore, of the so-called universal type.

The swivel block 14 provides a dovetailed slideway 15 in which the table 16 is operable. The table actuating screw is indicated at 20 and a power shaft which may be parallel to said screw is shown at 21. The shaft and screw are both preferably journaled in the table for translation therewith.

Mounted upon the table 16 is a machine tool attachment which, for the purposes of this disclosure, represents any machine tool attachment having a movable part which is to be power driven either from the screw or from the power shaft of the table. As a representative attachment of this sort, there is illustrated in Figure 1 a dividing head 22 having a power receiving element 23 to be driven through pinion 24 from the table power shaft 21. The arrangement by which the driving connection is established between these elements is illustrated diagrammatically in the accompanying disclosure. It comprises a gear 25 mounted upon the table power shaft and meshing with an intermediate gear 26 supported from the table and which, in turn, is meshed with the pinion 24 upon the power receiving element 23.

The particular means for connecting a prime mover to drive the mechanism forming the subject matter of this application are immaterial. In Figure 1, however, there is illustrated a pulley 28 to which a prime mover may be directly connected. From a rate changer 30, which may be located adjacent pulley 28, a universally jointed and telescopically extensible shaft 29 leads to a bevel gear set 31 carried by the saddle 13. Through this rate changer, shaft, and bevel gears, the power received by pulley 28 may be transmitted to an upright shaft 32 entering the lower side of the saddle. Any suitable power transmission train such as pinions 33, 34, and 35 may be used to transmit motion from shaft 32 through saddlle 13 to a driven element 36 which is disposed concentrically with reference to the axis about which the swivel block 14 rotates upon the saddle. In machine tools in which no swivel block is used, there will obviously be no axis through which the power must be transmitted and consequently the mechanism embodying this invention might be disposed at any point in the saddle and the train of gears 33, 34, and 35 might be omitted. In the particular embodiment of this invention which is herein disclosed, however, the driving mechanism to which this application particularly relates is disposed in the swivel block for the actuation of the table and parts carried thereby. Means have now been described for transmitting motion from a prime mover to the axis upon which the swivel block carrying the table is oscillatory. Inasmuch as this invention is not particularly concerned with the transmission of power from the prime mover to the driving mechanism beneath the table, it will be understood that the showing herein is diagrammatic and any of the many well known transmission trains may be substituted for that thus far described.

The mechanism in which this invention is embodied will now be described.

The driving element 36, which has been referred to heretofore as being disposed coaxially with the center of oscillation of swivel block 14, projects into a recess 38 in the swivel block and is provided therein with a bevel pinion 40. This pinion meshes with a pair of complementary driven pinions 41 and 42, respectively, which are mounted upon a common axis coinciding with the axis of power shaft 21. The driving pinions 41 and 42 are provided respectively with the sleeve-like hub portions 43 and 44 having suitable bearings in portions of swivel block 14. The driving pinion 40 constitutes the single source from which the table screw 20 and the table power shaft 21 are alternatively operated and it will be obvious that according as power is taken from driven pinion 41 or from driven pinion 42, the motion of the shaft and screw can be reversed.

The means by which said shaft and screw may alternatively be actuated in either direction from either of said driven pinions will now be described.

Figure 4:
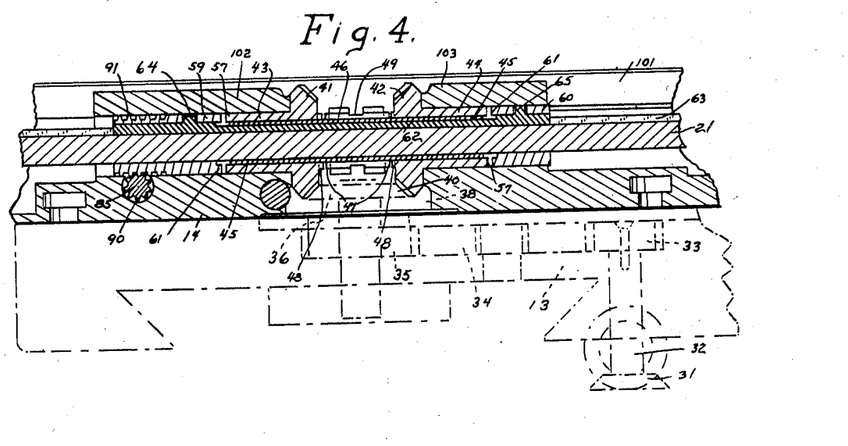
Figure 4 is a section taken on line 4—4 of Figure 3.
Figure 5:
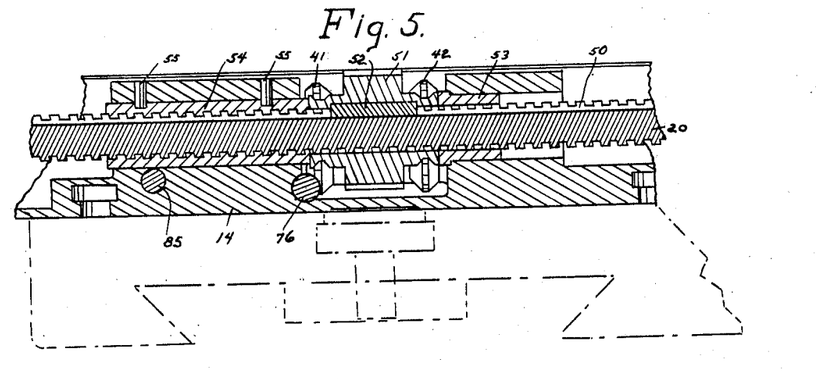
Figure 5 is a section taken on line 5—5 of Figure 3.

It can be noted in Figure 4 that a bearing sleeve 45 extends internally between the hubs 43 and 44 of the driven pinions 41 and 42, respectively. Within this sleeve, the table power shaft 21 is journaled and upon the sleeve between driven pinions 41 and 42 a double ended clutch member 46 provided with elongated pinion teeth is slidable. The clutch member 46 is provided at its ends with clutch teeth 47 which may be engaged with complementary teeth 48 upon the inner faces of the pinions 41 and 42. The peripheral groove 49 in the clutch and pinion element 46 is adapted to receive a shifting fork 69 whereby said element may be moved axially into operative engagement with either of the pinions 41 or 42 to receive motion therefrom. The clutch pinion element 46 is illustrated in its neutral position and it will be obvious that it can be power driven in either direction by engaging it with the proper bevel pinion 41 or 42.

The table actuating screw 20 is preferably journaled in bearings carried by the table and is provided with an axially extending keyway 50. The threads of the screw are preferably formed to provide peripheral bearing surfaces conforming to a cylinder whereby the gear 51 may be mounted to slide upon the periphery of the screw. A key 52 transmits motion from gear 51 to the screw 20 and is adapted to slide in keyway 50 to maintain the operative engagement between these parts despite the axial translation of the screw with the table. Gear 51 is confined against movement by suitable thrust members 53 and 54, the latter of which may comprise a fixed nut as shown. Dowel pins 55 may be used to connect the nut with the swivel block and secure it against either rotative or axial movement, whereby the screw 20, which is journaled in the table 16, will by its rotation within nut 54 propel the table in a direction corresponding to the direction of rotation of the screw.

The length of the clutch and pinion element 46 and of gear 51 is such that the pinion will remain permanently meshed with the gear despite the axial movement of the pinion for clutch purposes. Obviously, therefore, the screw 20 may be driven in either direction from the driving pinion 40, through one of the driven bevel pinions 41 or 42, thence through one set of clutch teeth 47 and 48 to the clutch pinion 46, and finally from element 46 to gear 51 and through the key 52 to the screw.

Not only may the screw be actuated in either direction by establishing a driving connection from the proper driven bevel pinion 41 and 42 but the power shaft 21 is also operable through driving connections established to it through these same pinions.

In addition to the clutch teeth 48 carried by bevel pinions 41 and 42 upon their inner faces, these pinions are also provided with similar clutch teeth 57 upon the outer ends of their respective hub portions 43 and 44. The clutch sleeves 59 and 60 are provided with inwardly directed clutch teeth 61 complementary to the teeth 57 of pinion sleeves 43 and 44, the arrangement being such that either of the clutch sleeves 59 or 60 may be impelled axially into operative driven engagement with the corresponding pinion sleeve. An elongated key 62 is slidable in a keyway 63 in the table power shaft 21 and is arranged to connect each of the clutch sleeves 59 and 60 to said power shaft in operative motion transmitting relation. The key 62 has the further function of connecting clutch sleeves 59 and 60 to each other for simultaneous axial movement. This result is accomplished by means of the provision upon the key of upstanding lugs 64 and 65 which seat respectively in corresponding apertures in clutch sleeves 59 and 60, the arrangement being such that the two sleeves, together with key 62, are slidable axially as a unit. It is obviously possible, by sliding the key 62 and the clutch sleeves 59 and 60 joined thereby, to connect the power shaft 21 at will with the hubs of either of the oppositely rotated driven bevel pinions 41 or 42.

The driving connections between the driving bevel gear 40 and power shaft 21 and screw 20 have now been completely set forth. By way of summary, attention may be called to the fact that two clutch elements are shown, each of which is movable in two directions to complete a power transmitting connection and is provided with a neutral position in which no power is transmitted. The clutch element 46 comprises a pinion continuously in mesh with a gear upon the screw and may be moved in either direction from its neutral position to engagement with the oppositely rotating bevel pinions 41 or 42. The other clutch element has just been described above and comprises clutch sleeves 59 and 60 connected together by a sliding key to move as a unit and adapted, when moved in opposite directions from its neutral position, to engage the power shaft 21 alternatively with bevel pinions 41 or 42.

As has already been suggested, means is provided for the manual or automatic control of these clutch elements and it is further contemplated that an interlocking mechanism shall be used to prevent the actuation of either clutch element at a time when the other is operative for power transmission purposes.

The first clutch element, to wit, the clutch and pinion 46, is actuated between its operative positions by means of a shifting fork 69. This fork is carried by a rack bar 65 which operates in a recess 66 in the swivel block 14. Recess 66 provides a slideway for the rack bar which is preferably substantially parallel to the axis of power shaft 21. Rack bar 65 is operated from the front of the machine tool by means of a handle 70 which carries a pair of upstanding pins 71 with which suitable dogs 72 upon the table may contact for the automatic actuation of clutch member 46. Handle 70 is fulcrumed for movement upon a pivot which may take the form of a stud 73. A pinion 74 upon said stud is connected with handle 70 for movement therewith and meshes with teeth 75 of a rack bar 76 extending toward the rear of swivel block 14. A second set of teeth 77 upon this rack bar mesh with a pinion 78 to which pinion 79 is connected for unitary rotation. Pinion 79 meshes with teeth 80 in the rack bar 65 which carries the clutch shifting fork 69. Thus upon the rotation of handle 70 in either direction its oscillatory movement imparts reciprocatory movement to rack bar 76 which is transmitted through the oscillatory pinions 78 and 79 to rack bar 65. The arrangement as illustrated is preferably such that upon moving handle 70 to the left rack bar 65 will also move to the left and if handle 70 be oscillated to the right rack bar 65 will move to the right. In either case, the clutch element 46 will be engaged by the oscillatory movement of handle 70 with one of the driven bevel pinions 41 or 42 and by such engagement the screw 20 will be caused to rotate in one direction or the other.

For the actuation of the clutch element which controls the power shaft 21 and which comprises the two clutch sleeves 59 and 60 interconnected by the sliding key 62, a rock shaft 85 is provided. This rock shaft carries an exposed crank 86 having a manually operable handle portion 87. The handle portion may comprise a pin axially movable with respect to the crank 86 and so arranged that in several positions of rock shaft 85 it may register with apertures 88 and 89 in the bed member or swivel block 14. The arrangement is preferably such that the apertures 88 define positions of crank 86 corresponding to the power transmitting positions of the clutch element actuated therefrom whereas the aperture 89 may be so disposed as to receive the pin when the clutch element is in its neutral position.

The rock shaft 85 is provided at 90 with axially elongated teeth which mesh with rack teeth 91 cut in the clutch sleeve 59, the arrangement being such that the oscillation of shaft 85 is adapted to impart reciprocatory motion to clutch sleeve 59 and to clutch sleeve 60 which is connected therewith to complete the clutch unit under discussion. Therefore, upon the oscillation of handle 87, crank 86, and rock shaft 85 from the neutral position in which these parts are illustrated in the accompanying drawings, the clutch element may be actuated in either direction axially of power shaft 21 to connect said shaft alternatively to the hub portions 43 or 44 of gears 41 and 42, respectively.

Figure 3:
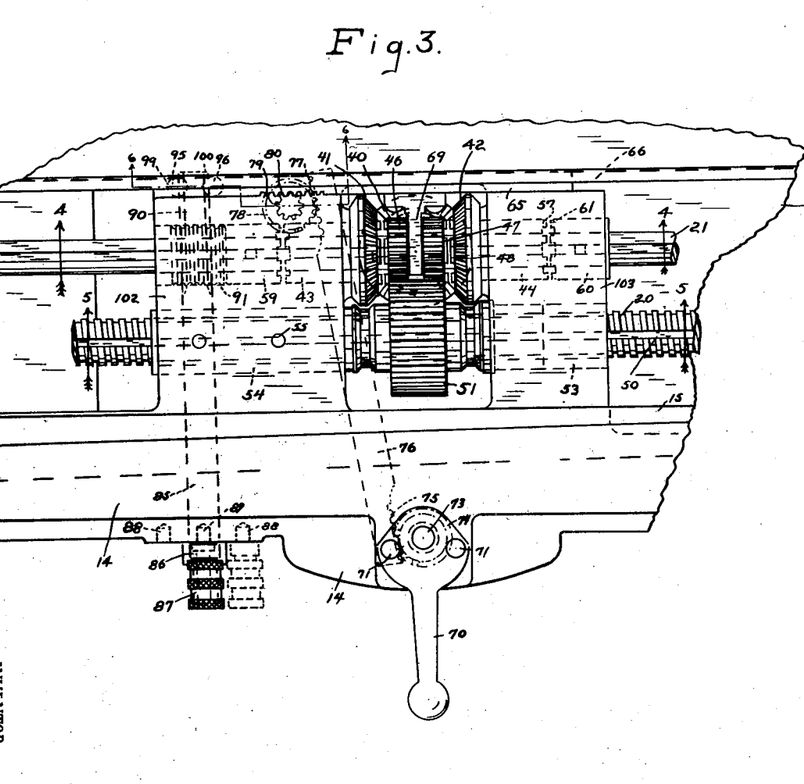
Figure 3 is an enlarged detail view in plan of a machine tool drive embodying this invention as disposed within a swivel block beneath a machine tool table.

As has previously been indicated, it is desired to provide an interlock between the two mechanisms which actuate the clutch elements for driving the power shaft and the screw. This interlock may take the form best illustrated in Figures 3 and 6.

Figure 6:
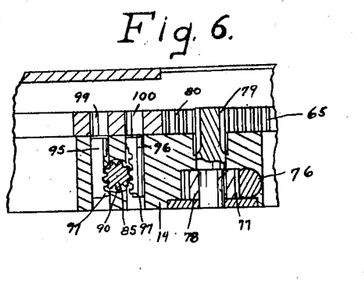
Figure 6 is a section taken on line 6—6 of Figure 3.

A pair of plungers 95 and 96 are each provided with rack teeth 97 meshing with the pinion teeth 90 formed in rock shaft 86. Each plunger is slidable in a bore guiding it for vertical movement. The arrangement is such that upon the oscillation of shaft 85 one of the plungers 95 and 96 will be caused to move upwardly and the other downwardly. In the neutral position of the rock shaft as defined by the engagement of the handle pin 87 with apertures 89, the plungers 95 and 96 will be at equal heights as shown in Figure 6.

Immediately above the upper extremities of plungers 95 and 96, when said plungers are in their neutral position, passes the rack bar 65 through which motion is transmitted for the actuation of clutch and gear element 46. Rack bar 65 is provided with bores 99 and 100 which, in the neutral position of said rack bar, are so disposed as to register respectively with the bores in which plungers 95 and 96 are operable. It will be obvious that should the rock shaft 85 be oscillated in either direction, one of the plungers 95 or 96 would be elevated thereby into the corresponding bore 99 or 100 in rack 65. The rack would thereby be keyed or locked against movement in either direction and consequently it would be impossible to move handle 70 in either direction or to actuate the pinion clutch element 46 into operative engagement with either of the gears 41 or 42. As soon, however, as the rock shaft 85 had been restored to its normal neutral position as illustrated in Figure 6, the rack 65 would thereby be released and control could again be exercised over the clutch pinion 46 by means of handle 70.

The interlocking mechanism is effective, also, to prevent the establishment of a driving connection to the power shaft when the screw is being driven. An inspection of the drawings will disclose the fact that in order to move the clutch pinion 46 into position to receive power from either of the bevel gears 41 or 42 for the operation of the table screw 20, it will be necessary to oscillate handle 70 to one side or the other and thereby to effect a longitudinal movement of rack 65 in some direction. If, however, the rack 65 is moved in either direction from the position in which it is illustrated in Figure 6, the bores 99 and 100 therein will pass out of registry with the corresponding bores in the swivel block 14 in which plungers 95 and 96 are reciprocable. Therefore, if, under the circumstances stated, an attempt be made to oscillate rock shaft 85 and thereby to shift clutch sleeves 59 and 60 to bring one of them into driven relation to bevel pinions 41 or 42, the plungers 95 and 96 would immediately encounter the under surface of rack bar 65 and thereby be locked against movement.

Nothing has been mentioned herein with regard to the construction of the swivel block. This invention is not concerned with the specific construction of swivel block 14, which may be of any ordinary construction, except in so far as it is necessary to deviate from standard practice to provide bearings and other openings for the operative assembly of the mechanism above described. The construction illustrated wherein the upstanding side rail portions 101 provide the dove-tailed slideway 15 for the table and are centrally joined by transverse members 102 and 103, is practical. The said transverse members serve as convenient means for mounting the operating parts as best appears in Figures 3 and 4.

It will be noted that the mechanism herein disclosed provides a very compact and simple arrangement of clutches and gearing for the actuation of either of two driven elements 20 and 21 from a common source of power, which, in the present case, comprises pinion 40. Furthermore, the two driven elements are actuated at different speeds due to the fact that the driving pinion 46 has fewer teeth than the driven pinion 51 with which it meshes. This fact is of importance in connection with the use of auxiliary mechanism to be connected with the screw and shaft in accordance with the disclosures of the companion applications above referred to. The clutch units through which power transmission to shafts 20 and 21 may be established are designed to be moved in opposite directions from their respective neutral points when it is desired to actuate the driven shaft 20 or 21 in opposite directions of rotation. Thus, if the driving gear 40 which comprises the source of power for the present invention, is driven in the proper direction, the machine tool table 16 may be provided with suitable trips 72 adapted to engage handle 70 to throw it in the direction of its neutral position, whereby the driving clutch connection to the screw will be broken and the table allowed to come to rest. The interlocking mechanism is such that regardless of the direction of rotation of either the screw 20 or power shaft 21, neither of these parts can be simultaneously in operation, unless through devices other than those disclosed herein.

I claim:

1. In a machine tool, the combination with a work table adjustable in a plurality of directions and provided with means for detachably securing work and table attachments directly thereto and means for the mechanical reciprocation thereof, of a rotatable shaft journaled in the table and available for the actuation of such attachments, a common source of power for said means and for said shaft, and driving connections independent of said shaft arranged to transmit power to said reciprocating means, whereby the table may be actuated without driving said shaft.

2. In a machine tool, the combination of a reciprocable work table mounted for adjustment in a plurality of different directions, a screw element and a nut element arranged to effect table reciprocation, means for removably securing a work supporting attachment to said table to be adjusted and to reciprocate therewith, a power shaft for such an attachment rotatably mounted for reciprocation with the table, a common drive source arranged for the actuation of one of said elements and of said shaft, driving connections independent of said shaft from said power source to the element driven thereby, and other connections from said power source to said shaft, whereby the driving connections to said element are adapted for the actuation of said element independently of said shaft.

3. In a machine tool, the combination with a horizontally reciprocable work table having a rotatatable screw shaft and a rotatable power shaft journaled therein with exposed ends in proximity, of an attachment mounted on said table and connected with one of said shafts, a common source of power for the actuation of said shafts, and means controlling the alternative actuation of said shafts from said source of power, said means being adapted to prevent the simultaneous actuation of said shafts directly from said source of power.

4. In a machine tool, the combination with a reciprocable work table and a rotatable shaft journaled therein, substantially parallel with the path of table reciprocation, of a common source of power for said table and said shaft, clutch controlled driving connections between said source of power and said table and shaft respectively, and an interlocking device between the clutches of said connections, whereby the simultaneous actuation of the table and shaft is prevented.

5. In a machine tool, the combination with a reciprocable work table and a rotatable shaft journaled therein substantially parallel to the direction of table reciprocation, of means for mechanically reciprocating said table, a common source of power for said table and said shaft, and driving connections independently controllable for the independent actuation of the table and shaft.

6. In a machine tool, the combination with a reciprocable work table provided with means for detachably securing work and table attachments, of a rotatable shaft journaled therein, a screw element and a nut element for the actuation of said table, a common source of power for said table and said shaft, driving connections independently controllable between said source of power and said shaft, and independent driving connections between said source of power and one of said elements, whereby said table and said shaft may be independently actuated.

7. In a machine tool, the combination with a relatively stationary support, an intermediate support and a table, said intermediate support being relatively adjustable upon said stationary support and said table being relatively adjustable in a different direction upon said intermediate support; of a rotatable power shaft journaled in said table; a table screw; a source of power common to said shaft and said screw and provided with operative connections for the actuation of either in all positions of said table; and means for independently reversing said screw.

8. In a machine tool, the combination with a work table provided with means for detachably securing work and table attachments thereto, means supporting said table for reciprocation, said means being independently adjustable in a different direction from that of table reciprocation, a rotatable power shaft journaled in said table for reciprocation therewith, a common source of power for said table and said shaft, driving connections between said source of power and said table and shaft, and a motion reverser in the motion transmitting connections leading to said table and adapted to reverse the direction of table travel independently of the direction of shaft rotation.

9. In a machine tool, the combination of a reciprocable work table and a rotatable shaft journaled therein, a source of power common to said table and said shaft, means for independently reversing the table, and an interlock arranged to prevent actuation of the shaft directly from said source when said table is driven in either direction.

10. In a machine tool, the combination of a reciprocable work table, a rotatable shaft mounted for movement with said table, a source of power common to the shaft and to the table, clutch controlled driving connections between said source of power and said shaft, a second set of driving connections between said source of power and the table including a reversing clutch, and an interlock between said reversing clutch and the clutch controlling the driving connections for the shaft, operative to prevent shaft actuation directly from said source when the table is reciprocated in either direction.

11. In a machine tool, the combination with a work table reciprocable in a plurality of directions, of a rotatable shaft journaled therein, a source of power common to said table and said shaft, and driving connections between said source of power and said table and said shaft, provided with means for the independent reversal of the shaft.

12. In a machine tool, the combination of a work table reciprocable in a plurality of directions, a rotatable shaft supported for reciprocation with the table and provided with an exposed coupling, a source of power common to said table and said shaft, a nut element and a screw element for the propulsion of said table, one of said elements being arranged to be driven from said source of power, and independently reversible driving connections between said shaft and said source of power.

13. In a machine tool, the combination of a reciprocable work table, a rotatable shaft supported for translation with the table, a source of power common to said table and said shaft, driving connections between said source of power and said table, independently reversible driving connections between said source of power and said shaft, and means for rendering the driving connections to the table inoperative when the driving connections for the shaft are operable to drive the shaft in either direction.

14. In a machine tool, the combination of a reciprocable work table, a rotatable shaft journaled therein, a source of power common to said shaft and to said table, means whereby the table and the shaft may be independently actuated in either direction from said source of power, and means preventing simultaneous actuation of said table and shaft.

15. In a machine tool, the combination of a horizontally reciprocable work table, a tool spindle, said table and spindle being mounted for relative swivel movement, a support for said table providing a source of power, a rotatable shaft mounted for translation with the table, table actuating means, driving connections between said source of power, said shaft and said means, such connections being provided with independent motion reversing clutches whereby the table and the shaft may be independently controlled for actuation in either direction, and an interlocking device associated with said clutches and adapted to prevent either clutch from becoming operative when the other is operative to transmit power in either directions.

16. In a machine tool, the combination of a reciprocable table and an adjustable support therefor, a rotatable power shaft journaled in the table and provided with an exposed coupling, a driving member journaled in the supporting means for actuating said power shaft, means for actuating said table, and motion transmitting connections between said driving member and said table actuating means, including a clutch adapted to render said table actuating means operative independently of the operation of said shaft.

17. In a machine tool, the combination of a reciprocable table and an adjustable support therefor, a rotatable shaft reciprocable with the table and arranged parallel to the path of reciprocation of said table, said shaft being provided with an exposed coupling, a driving member journaled in the support, motion transmitting connections between said member and said shaft, means including a nut element and a screw element for the actuation of said table, and clutch controlled motion transmitting connections between said member and one of said elements, whereby said table may be driven independently of the shaft.

18. In a machine tool, the combination of a reciprocable table and support therefor, a driving member journaled in the support, said table being swivelled for angular adjustment about the axis of said driving member, a rotatable power shaft journaled in the table, two sets of motion transmitting connections adapted respectively to drive the shaft and the table, and clutches operable to engage either set with said member to receive power therefrom.

19. In a machine tool, the combination with an adjustable support and a driving member journaled in the support, of a table mounted on said support for reciprocation transversely of the path of adjustment of said support and for rotation about the axis of said driving member, a table screw shaft and a table power shaft mounted in said table for movement therewith, two sets of motion transmitting connections respectively adapted to drive the shaft and the table, clutches for independently engaging each set of such connections with said member to receive power therefrom, and an interlocking device between said clutches arranged to prevent the simultaneous actuation thereof.

20. In a machine tool, the combination with a reciprocable table and a support therefor, of a rotatable shaft journaled in the table, two driving members journaled in the support, a table propeller, and a clutch connected with said propeller and engageable with each member, whereby the table may be operated from either of said members irrespective of shaft operation.

21. In a machine tool, the combination with a reciprocable table and a support therefor, of a rotatable shaft reciprocable with the table, two driving members journaled in the support, motion transmitting connections between one of said members and said shaft, a table propeller, and two clutch controlled driving trains extending respectively between each of said members and said propeller, whereby the table may be driven from either of said members irrespective of the rotation of said shaft.

22. In a machine tool, the combination with a reciprocable table and a support therefor, of a rotatable shaft journaled in the table, two driving members carried from said support, a clutch controlled driving train between each member and the shaft, and means preventing table actuation when either of said trains is operative to drive the shaft.

23. In a machine tool, the combination with a vertically adjustable support and two driving members mounted thereon and interconnected for opposite rotation, of a table reciprocable transversely of said support and provided with means for the detachable engagement of work and of table attachments thereto, a shaft reciprocable with said table, a table propeller, clutches operative to connect either of said members with said shaft for the rotation thereof, a clutch controlled train between one of said members and said propeller, and an interlock between said first mentioned clutches and the clutch controlling said train adapted to render said last mentioned clutch inoperative for power transmission when either of said first mentioned clutches is operative.

24. In a machine tool, the combination with a reciprocable table provided with means for attaching work thereto and having an independently adjustable support, of a rotatable power shaft journaled in the table, two driving members carried from the support, a clutch adapted to be connected with each of said members for table actuation, and a second clutch adapted to be connected with each of said members for shaft actuation.

25. In a machine tool, the combination with a reciprocable table and an adjustable support therefor, of a rotatable power shaft provided with an exposed coupling and reciprocable with the table, two driving members carried from the support and interconnected for rotation in opposite directions, a clutch operative to connect each of said members with the shaft, a table propeller, and a clutch operative to connect each of said members with said propeller.

26. In a machine tool, the combination with an adjustable support, of a table reciprocable horizontally thereon, a rotatable shaft journaled in the table substantially parallel to the path of reciprocation thereof and provided with an exposed coupling for the actuation of attachments on the table, two driving members rotatably carried from the support, a table controlling clutch engageable with each member, a shaft controlling clutch engageable with each member, and an interlocking device for said clutches, whereby no simultaneous engagement thereof can occur.

27. In a machine tool, the combination of a reciprocable table and a support therefor, of a rotatable shaft journaled in the table, two driving members journaled in the support, a table propeller, a clutch engageable with each member and connected with said propeller, a clutch engageable with each member and connected with said shaft, and means preventing the simultaneous engagement of the clutches.

28. In a machine tool, the combination of a reciprocable table, an independently adjustable support for said table, means for securing work and table attachments to said table, means for the reciprocation of said table, a rotatable shaft journaled in said table and substantially parallel to the direction of reciprocation thereof, a source of power common to said means and said shaft; reversible motion transmitting connections between said source of power, said means and said shaft whereby either the means or the shaft may be actuated in either direction; and hand levers individually controlling power transmission to said means and shaft.

29. In a machine tool, the combination with an adjustable support providing a source of power, a table horizontially reciprocable thereon in a direction transverse to the direction of adjustment of said support, and provided with means for detachably engaging work therewith, screw threaded means for the reciprocation of said table, a rotatable power shaft journaled therein and provided with an exposed coupling, independent driving connections from said source of power to the means and to the shaft each provided with a motion reverser, whereby either may be actuated in either direction, a hand lever individually controlling each such reverser, and an interlock between said hand levers.

30. In combination, a horizontally movable work receiving table, a plurality of shafts journaled in said table for movement therewith, a work engaging attachment carried by the table, means connecting said attachment with one of said shafts, and means for transmitting motion selectively to either of said shafts.

31. In combination, a horizontally movabe work receiving table, a table screw and a power shaft journaled in said table, a work engaging attachment carried by the table and alternatively engageable to be driven either by said screw or said shaft, a source of power and clutch-controlled driving connections from said source of power to said screw and shaft and adapted to permit of the selective actuation of said screw and of said shaft.

32. In a machine tool, the combination with a reciprocable table, of a screw and a power shaft journaled in said table, a table support, a pair of co-axial bevel gears journaled in the support, each of said gears being provided with two sets of clutch elements, complementary clutch elements engageable with each set of clutch elements of each gear, and driving connections between said screw and shaft and certain of said complementary clutch elements.

33. In a machine tool, the combination with a reciprocable table provided with a screw and shaft reciprocable therewith, of a table support, a pair of co-axial power transmitting elements rotatably carried from the support and interconnected for rotation in opposite directions, each of said elements being provided with clutch faces, and two complementary driven clutch elements arranged for actuation into operative engagement with a clutch face of each of said power transmitting elements.

34. In a machine tool, the combination of a reciprocable table provided with means for securing work and table attachments thereto, a parallel screw and shaft journaled therein in substantial parallelism with the direction of reciprocation of said table, a table support, a pair of co-axial bevel gears carried from the support and interconnected for opposite rotation, two clutch elements engageable with each of said bevel gears and associated respectively with the screw and shaft, and hand levers independently controlling the clutch elements connected with the screw and those connected with the shaft.

35. In a machine tool, the combination of a reciprocable table, a parallel screw and shaft journaled therein, a table support, a pair of co-axial bevel gears carried from said support, a spur gear co-axial with the bevel gears, means connected with said spur gear to be driven therefrom for the actuation of the screw, and means independent of said shaft whereby a driving connection may be established between said spur gear and either of said bevel gears.

36. In a machine tool, the combination with a reciprocable table, a table propelling mechanism including a screw and nut, a shaft journaled in said table parallel to said screw, a table support, a pair of co-axial driving elements rotatably carried from the support and intergeared for rotation in opposite directions, a spur gear co-axial with and disposed between the bevel gears and adapted to be operatively connected with either for rotation therewith, and motion transmitting connections independent of said shaft between said spur gear and said table propelling mechanism.

37. In a machine tool, the combination of a reciprocable table, a parallel screw and shaft journaled therein, a common drive source for said screw and shaft, and independent driving connections operative for screw actuation at one speed and shaft operation at a different speed, said connections being selectively operable to actuate either the screw or shaft independently of the other.

38. In a machine tool, the combination of a pair of co-axial gears interconnected for opposite rotation and each provided with two clutch faces, complementary clutch elements each engageable with one of said faces, and two driven members each arranged to receive power from elements complementary to the faces of both gears, whereby either of said members may be driven in either direction.

39. In a machine tool, the combination of a reciprocable table, table propelling mechanism including a screw and nut, a shaft reciprocable with the table, a pair of driving elements disposed co-axially with the shaft and interconnected for rotation in opposite directions, a clutch operative to connect each of said elements with the shaft, a gear slidable axially of the shaft and engageable alternatively with either of said elements to be driven therefrom, and a second gear connected with said table propelling mechanism and meshing with said first mentioned gear irrespective of the axial adjustment thereof.

40. In a machine tool, the combination with a reciprocable table, of a parallel screw, a power shaft, a pair of driving elements interconnected for rotation in opposite directions co-axially with said shaft, clutch elements connected with the shaft and movable axially thereof externally of said driving elements into driven engagement with the outer faces of said elements, and a clutch element movable axially of said shaft alternatively into engagement with the inner faces of said driving elements and permanently connected with said screw irrespective of its axial movement.

41. In a machine tool, the combination with a reciprocable table provided with independently operable support, of transmission mechanism including a parallel table screw and power shaft, and driving connections clutch-controlled for the actuation of the screw at one speed and the shaft at a different speed; and exposed couplings at the ends of said screw and shaft, whereby an attachment on said table may be alternatively driven from either.

42. In a machine tool, the combination of a horizontally reciprocable work table, a screw and a shaft journaled therein parallel to each other and to the path of reciprocation of said table and having their corresponding ends provided with exposed couplings, a driving source common to said screw and said shaft, clutch controlled driving connections adapted to actuate the screw at one speed and the shaft at a different speed, a hand lever controlling the clutch of each of said connections, and means preventing said clutches from being simultaneously operative for power transmission.

43. In a machine tool, the combination of a reciprocable table and support therefor, co-axial driving elements rotatably carried from the support, a spur gear disposed between said elements co-axially therewith and engageable alternatively with either of said elements, a second gear meshing with said spur gear and confined against axial movement out of mesh therewith and a shaft mounted on said table for reciprocation therewith and in splined concentric connection with said second gear whereby to be adapted to receive motion therefrom in any position of said table.

44. In a machine tool, the combination with a reciprocable table and a support therefor, of a lead screw and shaft each longitudinally splined and reciprocable with said table, a set of relatively fixed driving elements co-axial with said shaft and interconnected for opposite rotation, each of said elements being provided with inner and outer clutch faces, a spur gear slidable axially of said shaft between said elements and provided with clutch faces complementary to the inner faces of said elements, a gear splined to the screw and meshing with said spur gear, and a set of clutch elements splined to the shaft and interconnected for simultaneous axial movement with reference to said driving elements, each of said clutch elements being provided with a clutch face complementary to the external clutch face of one of the driving elements.

45. In a machine tool, the combination with a movable work supporting member, of a rotatable part for the actuation of said member, a power shaft, a pair of driving elements interconnected for opposite rotation and relatively fixed with reference to said member, a clutch unit shiftable into engagement with either of said driving elements and adapted to transmit power to said rotatable part, and a second clutch unit likewise shiftable into engagement with either of said elements and adapted to transmit power to said shaft.

46. In a machine tool, the combination with a reciprocable table provided with a parallel lead screw and power shaft, of a table support, a set of driving elements rotatably carried from said support and interconnected for rotation in opposite directions, each of said elements being provided with inner and outer clutch faces, a clutch sleeve disposed between said elements concentrically with said shaft and reciprocable into driven engagement with either of said elements, said sleeve being operatively connected with said lead screw for power transmission thereto, and a clutch unit disposed externally of said driving element upon said shaft, comprising a pair of interconnected clutch sleeves simultaneously movable and alternatively engageable with said driving elements, said sleeves being splined to said shaft.

47. In a machine tool the combination with a reciprocable table and a support therefor, of power transmitting mechanism including two rotatable elements mounted for translation with said table, mutually concentric rotatable members, clutch devices operatively connected respectively with said elements and each engageable with each of said members whereby to be available to drive any of said elements at a speed and direction corresponding to the speed and direction of any of said members, together with means for utilizing the rotation of one of said elements for table actuation.

48. In a machine tool, the combination with a table, of power transmitting mechanism including a pair of co-axial driving elements interconnected for opposite rotation, two clutch elements each engageable with either of the driving elements to receive rotation in either direction therefrom, two driven members operatively mounted for translation with said table and arranged respectively to receive motion from particular clutch elements, whereby said driven members may be independently actuated in either direction, together with means for employing the motion of one of said driven members for table actuation.

49. In a machine tool, the combination with a reciprocable table, of power transmitting mechanism including a plurality of driven shafts, a pair of driving rotors concentric with the first shaft and interconnected for opposite rotation, means for driving said rotors, a clutch member disposed between said rotors and alternatively engageable with either, said clutch member being operatively connected for power transmission to the second of said driven shafts, and a pair of clutch members external of said rotors, in splined relation to said shaft, and interconnected for unitary movement alternatively into engagement with either rotor.

50. In a machine tool, the combination with a reciprocable table, of power transmitting mechanism including a first and second shaft journaled in said table for translation therewith, a gear splined to the second shaft in driving relation thereto, a pinion concentric with the first shaft and controlled rotatably thereon in mesh with the gear on the second shaft, a pair of driving rotors concentric with the first shaft upon either side of the gear thereon and interconnected for opposite rotation, means for connecting said pinion selectively with either of said rotors and means for selectively connecting either of said rotors with the shaft to which they are concentric.

51. In a machine tool, the combination of a reciprocable table, means for the reciprocation thereof, a rotatable shaft journaled therein, a source of power common to said means and to said shaft, individually reversible driving connections leading from said source of power to said shaft and to said means respectively, whereby either may be actuated in either direction, and power actuated means for rendering one of said driving connections inoperative.

52. In a machine tool, the combination with a reciprocable table, of a rotatable shaft reciprocable therewith, a source of power common to said table and said shaft, individually reversible motion transmitting connections from said source of power to said table and to said shaft, and a power trip arranged to render inoperative the connections leading to the table.

JOSEPH B. ARMITAGE.